(12) United States Patent
Nehmad et al.

(10) Patent No.: US 9,580,073 B1
(45) Date of Patent: Feb. 28, 2017

(54) SYSTEM AND METHOD FOR 3D ADAS DISPLAY

(71) Applicant: Honda Motor Co., Ltd., Tokyo (JP)

(72) Inventors: Michael Nehmad, San Francisco, CA (US); Paul Konasewich, San Mateo, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/958,094

(22) Filed: Dec. 3, 2015

(51) Int. Cl.
| | |
|---|---|
| *B60W 30/02* | (2012.01) |
| *B60W 30/14* | (2006.01) |
| *G05D 1/00* | (2006.01) |
| *B60W 30/12* | (2006.01) |

(52) U.S. Cl.
CPC ............ *B60W 30/12* (2013.01); *B60W 30/14* (2013.01); *G05D 1/0061* (2013.01)

(58) Field of Classification Search
CPC combination set(s) only.
See application file for complete search history.

(56) References Cited

U.S. PATENT DOCUMENTS

| | | | |
|---|---|---|---|
| 6,741,223 B2 | 5/2004 | Kobayashi et al. | |
| 8,977,486 B2 | 3/2015 | Cho | |
| 2008/0161997 A1 | 7/2008 | Wengelnik et al. | |
| 2011/0153198 A1* | 6/2011 | Kokkas ............. | G01C 21/3638 701/533 |
| 2012/0253596 A1* | 10/2012 | Ibrahim ............. | G06K 9/00798 701/36 |
| 2013/0124041 A1* | 5/2013 | Belser ................ | B60W 30/095 701/41 |
| 2014/0225721 A1 | 8/2014 | Simon | |
| 2015/0062118 A1* | 3/2015 | Ebner ................... | B60K 37/06 345/419 |
| 2015/0178985 A1 | 6/2015 | Di Censo et al. | |
| 2016/0221575 A1* | 8/2016 | Posch ............... | B60W 50/0098 |
| 2016/0257308 A1* | 9/2016 | Pawlicki ............. | B60W 30/12 |

FOREIGN PATENT DOCUMENTS

WO    2015/032766    3/2015

OTHER PUBLICATIONS

N. Broy et al., "3D Displays in Cars: Exploring the User Performance for a Stereoscopic Instrument Cluster", AutomotiveUI'14, Sep. 17-19, 2014.
N. Broy et al., "Evaluating Stereoscopic 3D for Automotive User Interfaces in a Real-World Driving Study", CHI'15 Extended Abstracts, Apr. 18-23, 2015.

\* cited by examiner

*Primary Examiner* — Yonel Beaulieu
(74) *Attorney, Agent, or Firm* — Rankin, Hill & Clark LLP

(57) ABSTRACT

A method and system for an advanced vehicle driver assistance system activation display includes displaying on a vehicle display a two-dimensional image representing a vehicle driver assistance system and detecting activation of automatic vehicle control by the vehicle driver assistance system. Further, the method and system include displaying a transition on the vehicle display of the two-dimensional image to a three-dimensional image. The three-dimensional image simulates the automatic vehicle control in real-time.

17 Claims, 5 Drawing Sheets

SYSTEM AND METHOD FOR 3D ADAS DISPLAY

BACKGROUND

Vehicles can include various automatic driver assistance systems (ADAS) such as lane keeping assist systems and adaptive cruise control systems. In some implementations, the automatic control of such systems and the extent to which the system is controlling the vehicle is difficult for the driver to understand. For example, some vehicles can provide on a vehicle display an indication to the driver when an ADAS is engaged. However, these types of indications fail to provide adequate communication to the driver indicating the true engagement of the ADAS features.

BRIEF DESCRIPTION

According to one aspect, a computer-implemented method for advanced vehicle driver assistance system activation display includes displaying on a vehicle display a two-dimensional image representing a vehicle driver assistance system and detecting activation of automatic vehicle control by the vehicle driver assistance system. The method includes displaying a transition on the vehicle display of the two-dimensional image to a three-dimensional image. The three-dimensional image simulates the automatic vehicle control in real-time.

According to another aspect, a system for advanced vehicle driver assistance system activation display includes a vehicle display and a processor. The processor is operatively connected for computer communication to the vehicle display. The processor includes a vehicle condition detection module to detect activation of automatic vehicle control by the vehicle driver assistance system. The processor includes an image generation module to generate a three-dimensional image. The three-dimensional image simulates the automatic vehicle control in real time. The processor includes a vehicle display control module to display the three-dimensional image on the vehicle display.

According to a further aspect, a non-transitory computer-readable medium storing computer-executable instructions that when executed by a computer, which includes at least a processor, cause the computer to perform a method. The method includes displaying on a vehicle display a two-dimensional image indicating a status of a vehicle driver assistance system and detecting automatic vehicle control by the vehicle driver assistance system. The method includes displaying a transition on the vehicle display of the two-dimensional image to a three-dimensional image. The three-dimensional image simulates the automatic vehicle control over a period of time.

DETAILED DESCRIPTION

Figure 1:
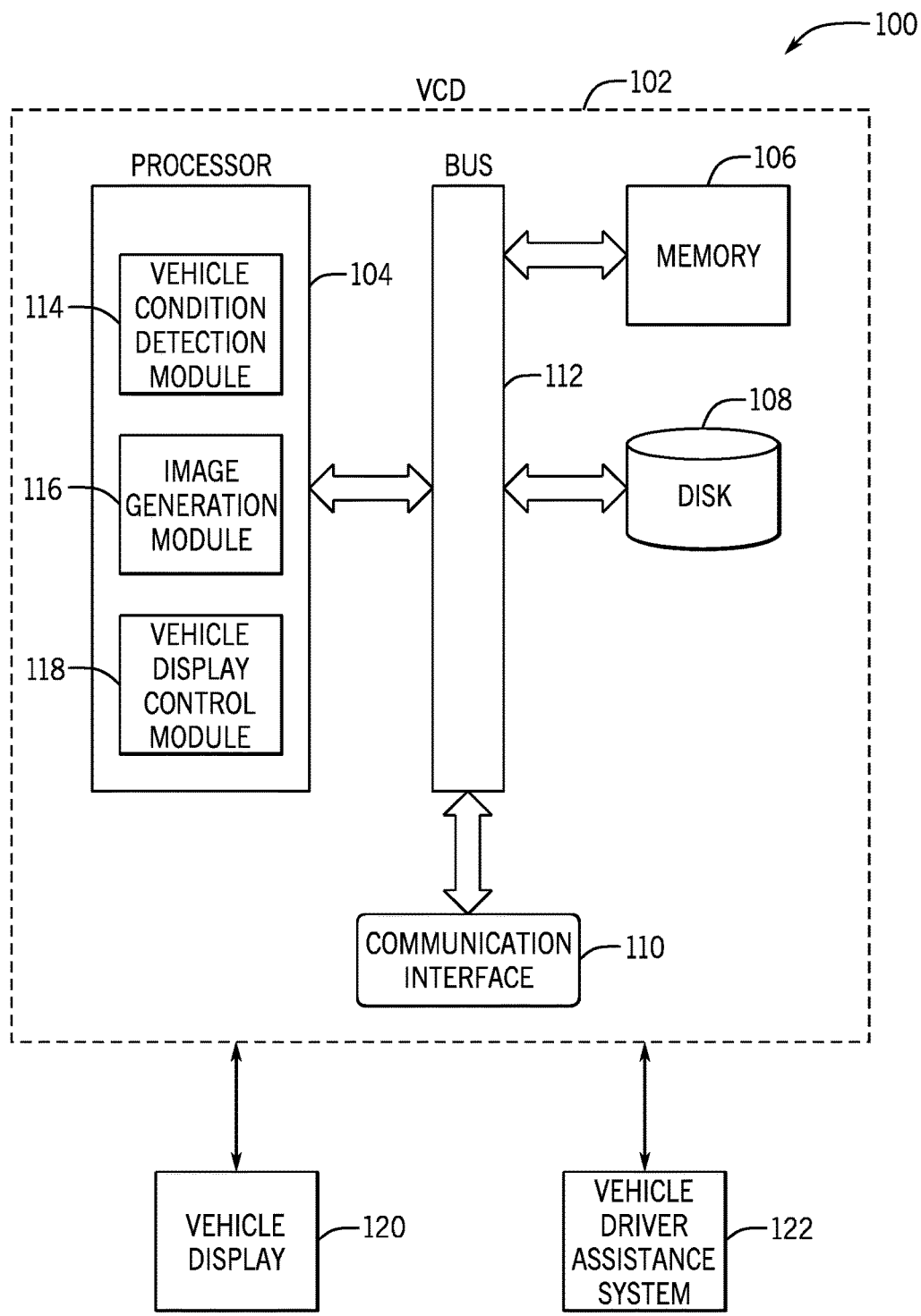
FIG. 1 is a schematic block diagram illustrating an exemplary operating environment and exemplary system implementing advanced vehicle driver assistance system activation display in accordance with one embodiment.

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into organized into different architectures.

A "bus," as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

A "disk," as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

A "module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection," or a connection by which entities are "operably connected," is one in which signals, physical communications, and/or logical communications can be sent and/or received. An operable connection can include a wireless interface, a physical interface, a data interface, and/or an electrical interface.

A "processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multi-core processors and co-processors and other multiple single and multicore processor and co-processor architectures. The processor can include various modules to execute various functions.

A "vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

Referring now to the drawings, wherein the showings are for purposes of illustrating one or more exemplary embodiments and not for purposes of limiting the same, FIG. 1 is a schematic block diagram illustrating an exemplary operating environment and exemplary system implementing advanced vehicle driver assistance system activation display in accordance with one embodiment. The components of the environment 100 as well as the components of other systems, hardware architectures, and software architectures discussed herein, can be combined, omitted, or organized into different architectures for various embodiments. Further, as will be discussed herein, the components of the environment 100 can be implemented with or associated with a vehicle (not shown).

In the illustrated embodiment of FIG. 1, the environment 100 includes a vehicle computing device 102 (VCD) with provisions for processing, communicating and interacting with various components of a vehicle and other components of the environment 100. In one embodiment, the VCD 102 can be implemented with the vehicle (not shown), for example, as part of a telematics unit, a head unit, a navigation unit, an infotainment unit, an electronic control unit, among others. In other embodiments, the components and functions of the VCD 102 can be implemented remotely from the vehicle, for example, with a portable device (not shown) or another device connected via a network (not shown). Exemplary devices can include wearable devices, network storage devices, connected vehicles, other networks (e.g., V2V networks), among others.

Generally, the VCD 102 includes a processor 104, a memory 106, a disk 108, and a communication interface 110, which are each operably connected for computer communication via a bus 112 and/or other wired and wireless technologies. The communication interface 110 provides software and hardware to facilitate data input and output between the components of the VCD 102 and other components, networks, and data sources, which will be described herein. Additionally, the processor 104 includes a vehicle condition detection module 114, an image generation module 116, and a vehicle display control module 118, each suitable for providing advanced vehicle driver assistance system activation display facilitated by the components of the environment 100.

The VCD 102 is also operably connected for computer communication (e.g., via the bus 112 and/or the communication interface 110) to a vehicle display 120. In one embodiment, the vehicle display 120 can be a display in an instrument cluster of a vehicle. For example, the vehicle display 120 can be a glassless three-dimensional display in the instrument cluster. The vehicle display 120 can display images and graphics in two-dimensions and/or three-dimensions. In other embodiments, the vehicle display 120 can be implemented and/or positioned in other areas of the vehicle, for example, a center console, a portable device located in the vehicle, among others. As will be discussed herein, the vehicle display control module 118 can control the vehicle display 120 to provide advanced vehicle driver assistance system activation display.

Further, the VCD 102 is operably connected for computer communication (e.g., via the bus 112 and/or the communication interface 110) to one or more a vehicle driver assistance system 122. Vehicle driver assistance system 122 can include vehicle systems that help a driver in the driving process. These systems can automatically control, adapt, and/or enhance vehicle systems for safety and better driving. Vehicle driver assistance system 122 can include but are not limited to, a lane keeping assist system, an automatic cruise control system, a collision mitigation system, an automatic parking system, an intelligent speed adaption system, a low speed follow system, a brake assist system, among others.

The vehicle driver assistance system 122 can include various sensors (not shown) to facilitate the features and controls of the vehicle driver assistance system 122.

FIG. 1 will now be described in operation according to an exemplary embodiment. As discussed above with FIG. 1, a system for advanced vehicle driver assistance system activation display includes a processor 104 operatively connected for computer communication to a vehicle display 120. The processor 104 includes a vehicle condition detection module 114 that can detect activation of automatic vehicle control implemented by vehicle driver assistance system 122. Thus, the vehicle condition detection module 114 can detect a control action (e.g., an automatic control feature, a corrective action) activated by the vehicle driver assistance system 122. As an illustrative example, automatic vehicle control and/or a control action by a lane keeping assist system can include automatic control of vehicle systems (e.g., a steering system) to keep the vehicle in a particular lane.

The vehicle condition detection module 114 can monitor the vehicle driver assistance system 122 for activation of the vehicle driver assistance system 122 and/or a feature of the vehicle driver assistance systems 120. In some embodiments, the vehicle condition detection module 114 can receive a signal from the vehicle driver assistance system 122 upon activation of the vehicle driver assistance system 122. Further, in other embodiments, the vehicle condition detection module 114 can receive data from the vehicle driver assistance system 122 indicating the action and/or control activated by the vehicle driver assistance system 122 in real-time.

As discussed above, the processor 104 includes the image generation module 116 to generate a three-dimensional image. The three-dimensional image simulates the automatic vehicle control activated by the vehicle driver assistance system 122. Thus, the vehicle condition detection module 114 can transmit information regarding the automatic vehicle control and the vehicle driver assistance system 122 to the image generation module 116. In one embodiment, the image generation module 116 augments the three-dimensional image by shifting the three-dimensional image to simulate motion of the automatic vehicle control.

Further, the vehicle display control module 118 of the processor 104 displays the three-dimensional image on the vehicle display 120. In one embodiment, the vehicle display control module 118 can initially display a two-dimensional image on the vehicle display 120. For example, the two-dimensional image indicates an inactive state and/or status of the vehicle driver assistance system 122. In other embodiments, the two-dimensional image indicates the vehicle driver assistance system 122 are ON, but are not currently engaged. Thus, in this embodiment, the vehicle display control module 118 can display a transition from a two-dimensional image initially displayed on the vehicle display 120 to the three-dimensional image generated by the image generation module 116 on the vehicle display 120. This transition provides clear communication that the vehicle driver assistance system 122 is currently activated and controlling the vehicle.

In a further embodiment, the vehicle condition detection module 114 can detect deactivation of the automatic vehicle control. For example, the vehicle condition detection module 114 can monitor the vehicle driver assistance system 122 for deactivation of the vehicle driver assistance system 122 and/or a feature of the vehicle driver assistance system 122. In some embodiments, the vehicle condition detection module 114 can receive a signal from the vehicle driver assistance system 122 upon deactivation of the vehicle driver assistance system 122. Thus, upon detecting deactivation of the vehicle driver assistance system 122, the vehicle display control vehicle condition detection module 114 can display a second transition from the three-dimensional image to a two-dimensional image on the vehicle display 120. The two-dimensional image indicates deactivation of the automatic vehicle control, for example, the vehicle driver assistance system, although may still be on, the vehicle driver assistance system 122 is not currently engaged and/or automatically controlling the vehicle.

Figure 2A:
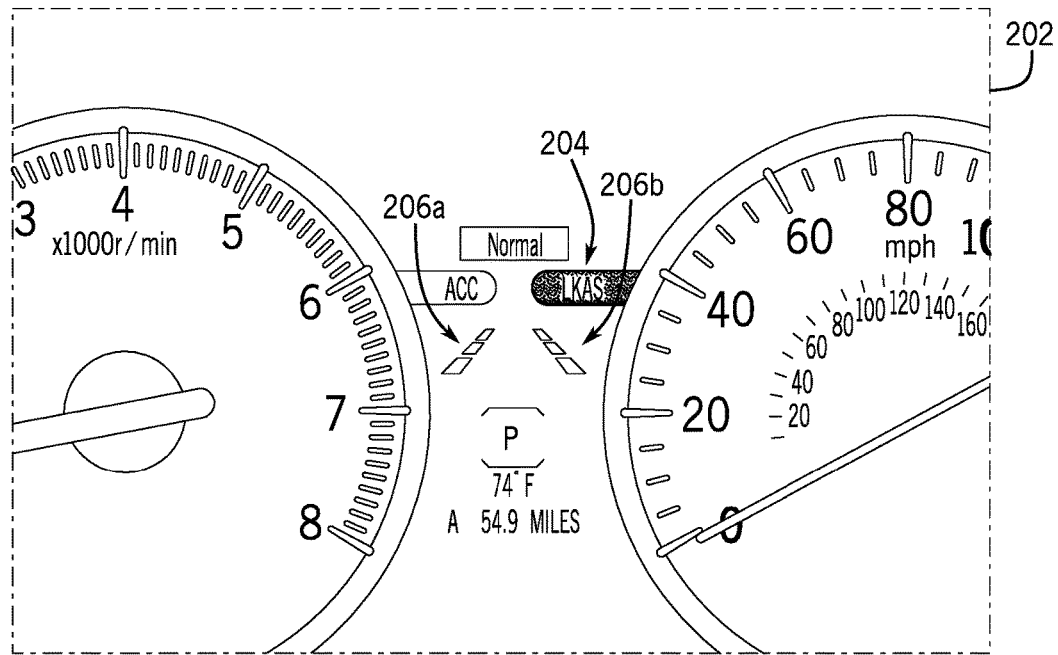
FIG. 2A is a schematic view of an exemplary vehicle display illustrating a two-dimensional image related to a lane keeping assist system according to an embodiment.

An illustrative example will now be described with reference to FIGS. 1, 2A and 2B. The illustrative examples discussed herein are exemplary in nature and other vehicle driver assistance systems can be implemented. In FIG. 2A, a schematic view 202 of a vehicle display 120 as an instrument cluster is shown that illustrates a two-dimensional image related to a lane keeping assist system according to an exemplary embodiment. As can be seen in view 202, the graphics displayed in the center of the instrument cluster are displayed two-dimensionally. In particular, the graphics displayed in two-dimensions include a lane keeping assist system indicator and the lane markings of a current lane the vehicle is travelling within, specifically, a left lane marking 206a and a right lane marking 206b. The lane keeping assist system indicator 204 is illuminated indicating that the lane keeping assist system is ON, but is not activated (e.g., not currently engaged in automatic vehicle control).

Figure 2B:
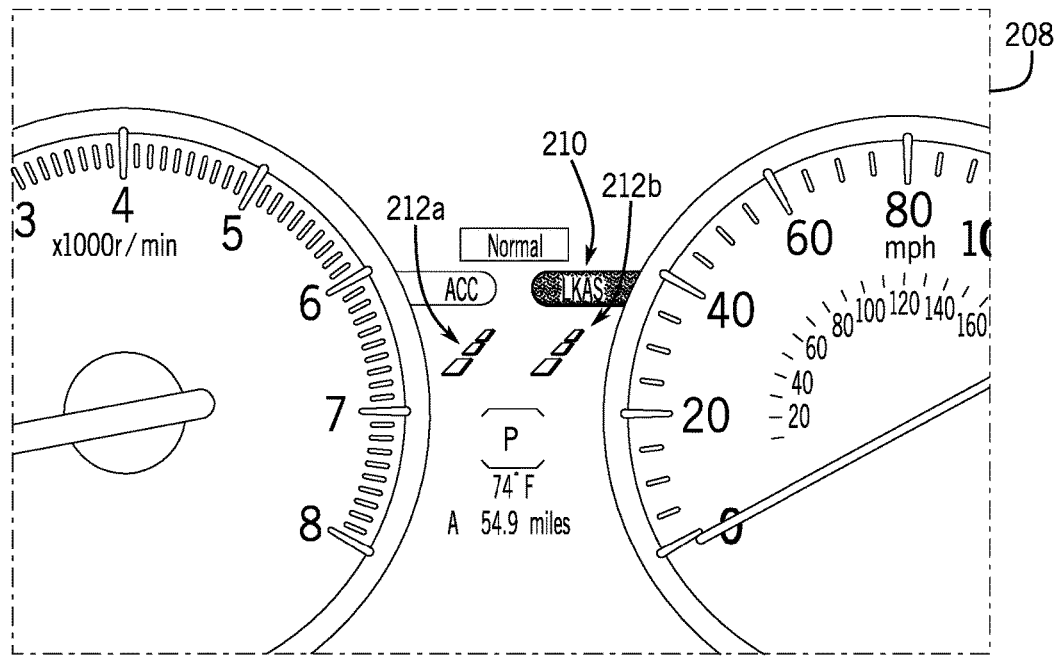
FIG. 2B is a schematic view of the vehicle display of FIG. 2A illustrating a three-dimensional image related to a lane keeping assist system according to an embodiment.

FIG. 2B illustrates a schematic view 208 of the vehicle display 120 shown in FIG. 2A. In view 208, a three-dimensional image related to a lane keeping assist system is displayed. In this example, the graphics displayed in the center of the instrument cluster are shown three-dimensionally. Specifically, the lane markings, including a left lane marking 212a and a right lane marking 212b are shown as three-dimensional images according to the automatic vehicle control being implemented by the lane keeping assist system in real-time. Thus, the lane markings indicate the direction and how much the vehicle is being controlled by the lane keeping assist system to steer the vehicle back into the center of a lane. To this point, in FIG. 2B, the left lane marking 212a and the right lane marking 212b in three-dimensions illustrate sensation and/or motion of the automatic vehicle control. As an illustrative example, if the vehicle is drifting to the right of the lane, the lane keeping assist system is activated and automatically controls the vehicle to move back towards the center of the lane. To indicate this automatic control the vehicle display displays the right lane marking 212b in three-dimensions tilted upwards creating a slowed graphic down to the left. This three-dimensional image simulates the action activated by the lane keeping assist system in real time. In one embodiment, the two-dimensional images shown in FIG. 2A are transitioned to the three-dimensional images shown in FIG. 2B upon activation of the lane keep assist system. Accordingly, and with reference to FIG. 1, the image generation module 116 generates the three-dimensional image to simulate a corrective action activated by the lane keeping assist system. The three-dimensional image is a graphic representing the lane markings and the image generation module 116 can augment the graphic of the lane markings to simulate the correct action activated by the lane keeping assist system.

Figure 3A:
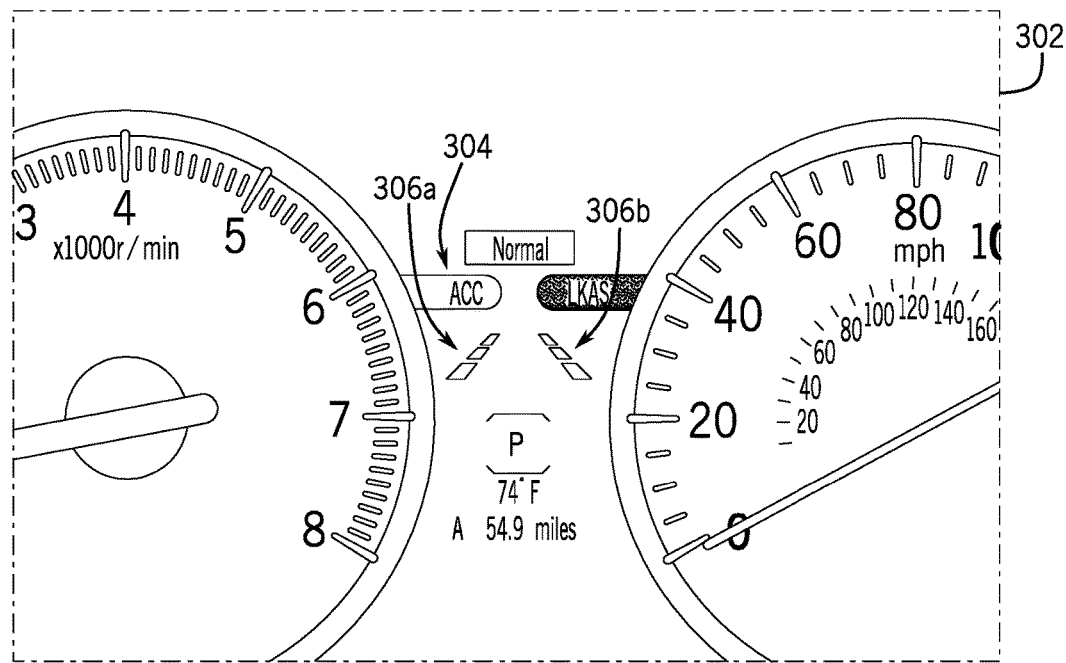
FIG. 3A is a schematic view of an exemplary vehicle display illustrating a two-dimensional image related to an automatic cruise control system according to an embodiment.

Another illustrative example will now be described with reference to FIGS. 1, 3A, and 3B. In FIG. 3A, a schematic view 302 of a vehicle display 120 as an instrument cluster is shown that illustrates a two-dimensional image related to an automatic cruise control system according to an exemplary embodiment. As can be seen in view 302 the graphics displayed in the center of the instrument cluster are shown in two-dimensions. In particular, the graphics displayed in two-dimensions include an automatic cruise control system indicator 304 and the lane markings of a current lane the vehicle is travelling within, specifically, a left lane marking 306*a* and a right lane marking 306*b*. The automatic cruise control system indicator 304 is illuminated indicating that the automatic cruise control system is ON, but is not activated (e.g., not currently engaged in automatic vehicle control).

Figure 3B:
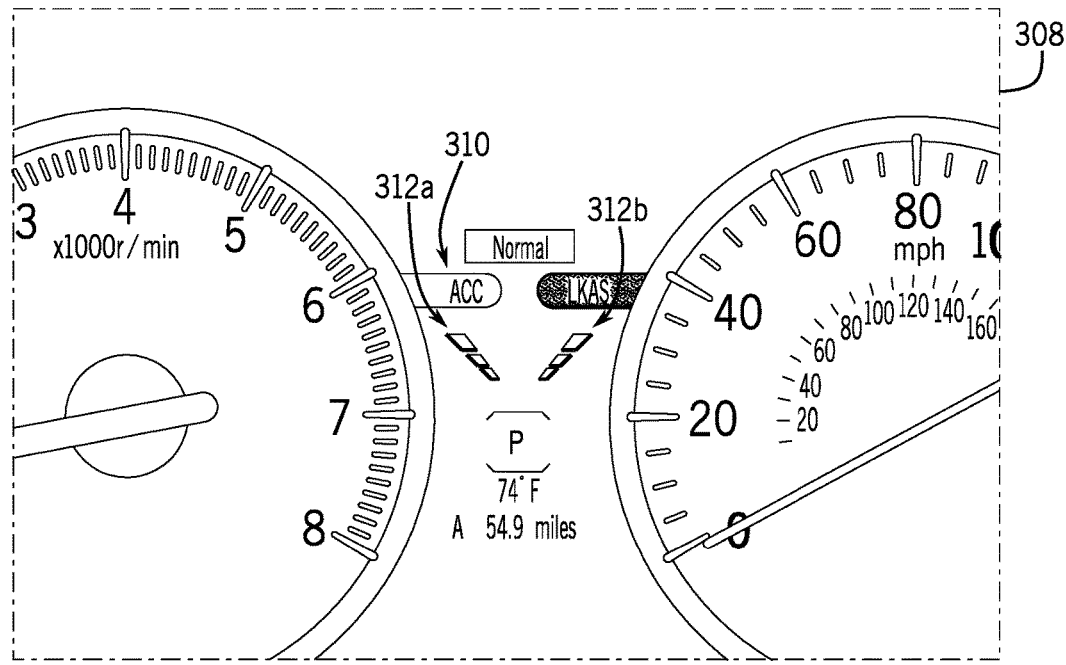
FIG. 3B is a schematic view of the vehicle display of FIG. 3A illustrating a three-dimensional image related to an automatic cruise control system according to an embodiment.

In contrast, FIG. 3B illustrates a schematic view 308 of the vehicle display 120 shown in FIG. 3A, but illustrating a three-dimensional image related to an automatic cruise control system according to an exemplary embodiment. In this example, the graphics displayed in the center of the instrument cluster are shown in three-dimensions. Specifically, the lane markings, including the left lane marking 312*a* and the right lane marking 312*b*, are now shown as three-dimensional images according to the automatic vehicle control being implemented by the automatic cruise control system in real-time. Thus, the lane markings are shifted closer to the driver as a distance between the vehicle and a target vehicle detected by the automatic cruise control system decreases. If the distance increases, the lane markings are shifted further away from the driver. Accordingly, the lane markings simulate the sensation and/or motion of the automatic cruise control system in real time.

Figure 4:
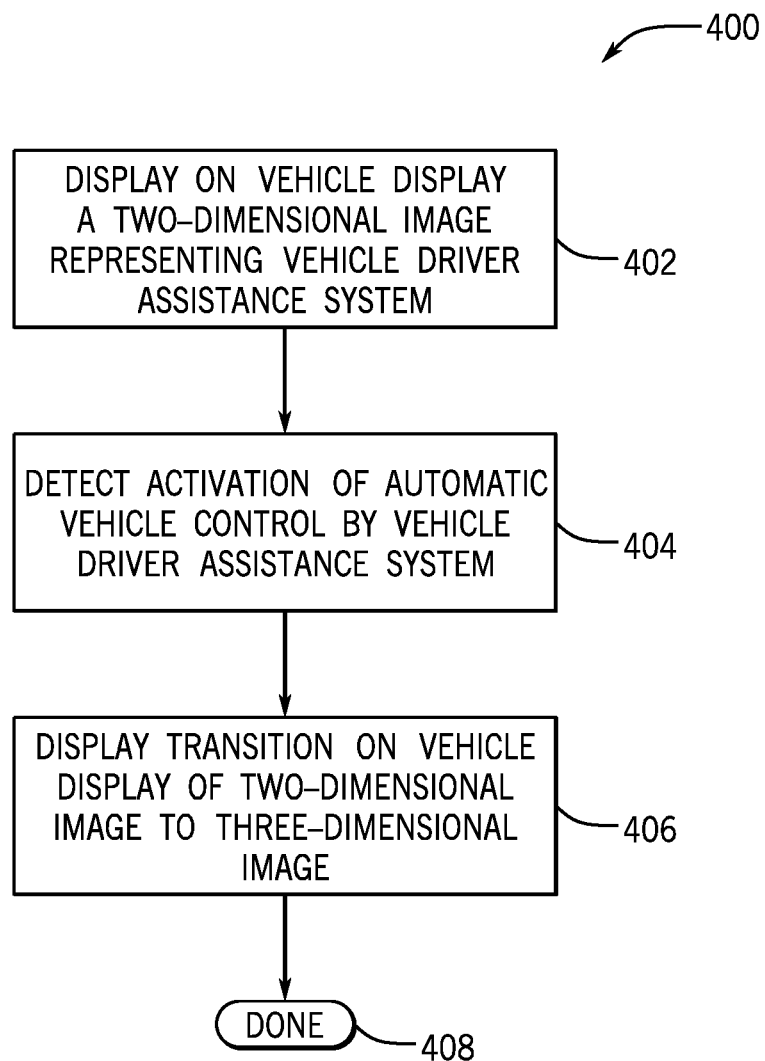
FIG. 4 is a flow diagram of an exemplary method for advanced vehicle driver assistance system activation display according to an embodiment.

Referring now to FIG. 4, a method 400 for advanced vehicle driver assistance system activation display will be described. FIG. 4 will be described with reference to the components of FIG. 1. The method includes at block 402, displaying on a vehicle display a two-dimensional image representing the vehicle driver assistance system. For example, the vehicle condition detection module 114 can determine that a vehicle driver assistance system 122 is ON, but not currently engaged and controlling the vehicle. Accordingly, the image generation module 116 can generate a two-dimensional image and/or augment a two-dimensional image based on the vehicle driver assistance system 122 status. The vehicle display control module 118 can display the two-dimensional image on the vehicle display 120. As an illustrative example referring to FIG. 2A, view 202 illustrates graphics displayed in the center of the instrument cluster in two-dimensions. In particular, the graphics displayed in two-dimensions include lane markings 204 and a lane keeping assist system indicator 206. The lane keeping assist system indicator 206 is illuminated indicating that the lane keeping assist system is ON, but is not activated (e.g., not currently engaged in automatic vehicle control). In some embodiments, the two-dimensional image discussed herein can include more than one two-dimensional image.

Referring again to FIG. 4, at block 404 the method includes detecting activation of automatic vehicle control by the vehicle driver assistance system. Thus, the vehicle condition detection module 114 can detect whether a vehicle driver assistance system 122 has been engaged, or activated for automatic vehicle control. For example, the vehicle condition detection module 114 can receive an activation signal from the vehicle driver assistance system 122. Further, the vehicle condition detection module 114 can receive data about a feature and/or control action activated by the vehicle driver assistance system 122. For example, in one embodiment, detecting automatic vehicle control by the vehicle driver assistance system includes detecting a control action activated by the vehicle driver assistance system. A control action can be a feature of the vehicle driver assistance system 122. For example, an automatic cruise control system can engage and/or activate a control action by automatically controlling the vehicle to increase or decrease a headway distance from a target vehicle travelling in front of the vehicle. In some embodiments, the control action is a corrective action. For example, a lane keep assist system can take a corrective action by automatically controlling (e.g., controlling steering of the vehicle) the vehicle to move towards the center of a lane.

At block 406, the method includes displaying a transition on the vehicle display of the two-dimensional image to a three-dimensional image. The three-dimensional image simulates the automatic vehicle control in real-time. Accordingly, the image generation module 116 can generate one or more three-dimensional images that simulate the automatic vehicle control. The vehicle display control vehicle condition detection module 114 can transition the two-dimensional image displayed on the vehicle display 120 to the three-dimensional image. As an illustrative example referring to FIG. 2A, the lane markings 210 are now shown as a three-dimensional image according to the automatic vehicle control being implemented by the lane keeping assist system in real-time. Thus, the lane markings 210 indicates the direction and how much the vehicle is being controlled by the lane keeping assist system to steer the vehicle back into the center of a lane. Therefore, the lane markings 210 tilt in three-dimensions to illustrate this sensation and/or motion of the automatic vehicle control. As an illustrative example, if the vehicle is drifting to the right of the lane, the lane keeping assist system is activated and automatically controls the vehicle to move back towards the center of the lane. Thus, the right side of the lane markings 210 tilt upwards creating a slowed graphic down to the left. The image generation module 116*c* can continue to augment the three-dimensional image generation module 116 to represent the automatic vehicle control in real-time and the vehicle display control module 118 can update the vehicle display 120 accordingly.

Figure 5:
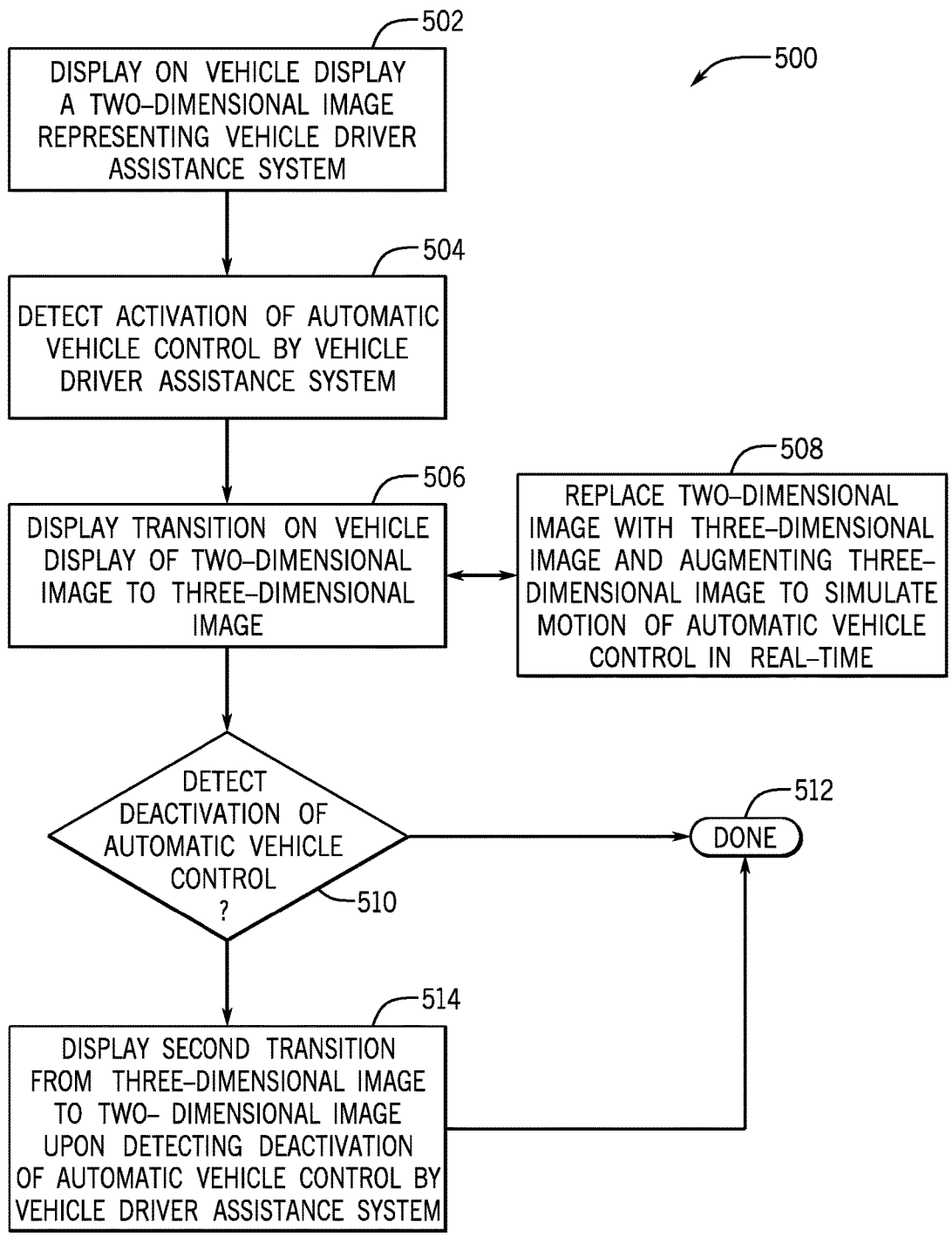
FIG. 5 is a flow diagram of another exemplary method for advanced vehicle driver assistance system activation display according to another embodiment.

Referring now to FIG. 5, an alternative embodiment of a method 500 for advanced vehicle driver assistance system activation display will be described. FIG. 5 will be described with reference to the components of FIG. 1 and FIG. 4. In FIG. 5, blocks 502, 504, and 506 correspond to blocks 402, 404, and 406 of FIG. 4, which are discussed in detail below. In one embodiment, displaying the transition on the vehicle display includes replacing the two-dimensional image with the three-dimensional image to simulate motion of automatic vehicle control in real-time at block 508. In a further embodiment, block 508 displaying the transition on the vehicle display includes replacing the two-dimensional image with the three-dimensional image can include augmenting the three-dimensional image to simulate motion of the automatic vehicle control in real-time.

Further, in one embodiment, at block 510, the method can include detecting deactivation of the automatic vehicle control by the vehicle driver assistance system. The vehicle condition detection module 114 can detect the deactivation of the automatic vehicle control of the vehicle driver assistance system 122 that was previously activated. Deactivation of the automatic vehicle indicates that the vehicle driver assistance system 122 is no longer currently engaged and is not automatically controlling the vehicle. In one embodiment, the vehicle condition detection module 114 can receive a deactivation signal from vehicle driver assistance system 122 indicating deactivation of the automatic vehicle control. If deactivation of automatic vehicle control is not detected, the method can end at block 512. Further, if deactivation of automatic vehicle controls is not detected, the image generation module 116 in conjunction with the vehicle display control module 118 can continue to augment and/or update the three-dimensional image to display real-time automatic vehicle control by the vehicle driver assistance system 122.

However, if deactivation of the automatic vehicle control is detected at block 510, the method can include at block 514 displaying a second transition from the three-dimensional image to the two-dimensional image upon detecting deactivation of the automatic vehicle control by the vehicle driver assistance system. Thus, the vehicle display control module 118 can transition the three-dimensional image to the two-dimensional image initially displayed on the vehicle display 120. For example, the three-dimensional image shown in FIG. 2B, can be transitioned back to the two-dimensional image shown in FIG. 2A. Thus, as described herein and shown in the illustrative examples, the transitions from the two-dimensional image to the three-dimensional image and vice versa provide a clear indication of automatic vehicle control of a vehicle driver assistance system 122.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules, or other data. Non-transitory computer readable storage media excludes transitory and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for an advanced vehicle driver assistance system activation display, comprising:
displaying on a vehicle display a two-dimensional image representing the vehicle driver assistance system;
detecting activation of automatic vehicle control by the vehicle driver assistance system; and
displaying a transition on the vehicle display of the two-dimensional image to a three-dimensional image, including replacing the two-dimensional image with the three-dimensional image and augmenting the three-dimensional image to simulate motion of the automatic vehicle control in real-time.

2. The computer-implemented method of claim 1, wherein detecting automatic vehicle control by the vehicle driver assistance system includes detecting a control action activated by the vehicle driver assistance system.

3. The computer-implemented method of claim 2, wherein the three-dimensional image simulates the control action activated by the vehicle driver assistance system.

4. The computer-implemented method of claim 1, comprising detecting deactivation of the automatic vehicle control by the vehicle driver assistance system.

5. The computer-implemented method of claim 4, comprising displaying a second transition from the three-dimensional image to the two-dimensional image upon detecting deactivation of the automatic vehicle control by the vehicle driver assistance system.

6. The computer-implemented method of claim 1, wherein the vehicle driver assistance system is a lane keeping assist system.

7. The computer-implemented method of claim 6, wherein the three-dimensional image simulates a corrective action engaged by the lane keeping assist system.

8. The computer-implemented method of claim 7, wherein the three-dimensional image represents lane markings and the lane markings are augmented to tilt according to the corrective action thereby simulating the corrective action of the lane keeping assist system in real-time.

9. A system for an advanced vehicle driver assistance system activation display, comprising:
a vehicle display; and
a processor operatively connected for computer communication to the vehicle display, the processor including,
a vehicle condition detection module causes the processor to detect activation of automatic vehicle control by the vehicle driver assistance system;
an image generation module causes the processor to generate a three-dimensional image, wherein the three-dimensional image simulates the automatic vehicle control in real time, and the image generation module causes the processor to augment the three-dimensional image by shifting the three-dimensional image to simulate motion of the automatic vehicle control;
a vehicle display control module causes the processor to display the three-dimensional image on the vehicle display.

10. The system of claim 9, wherein the vehicle display control module causes the processor to display a transition from a two-dimensional image initially displayed on the vehicle display to the three-dimensional image on the vehicle display.

11. The system of claim 9, wherein the vehicle condition detection module causes the processor to detect a control action activated by the vehicle driver assistance system.

12. The system of claim 9, wherein the vehicle condition detection module causes the processor to detect deactivation of the automatic vehicle control.

13. The system of claim 12, wherein the vehicle display control module causes the processor to display a second transition from the three-dimensional image to a two-dimensional image on the vehicle display upon receiving a signal from the vehicle condition detection module indicating deactivation of the automatic vehicle control.

14. The system of claim 9, wherein the vehicle driver assistance system is a lane keeping assist system and the image generation module causes the processor to generate the three-dimensional image to simulate a corrective action activated by the lane keeping assist system.

15. The system of claim 14, wherein the three-dimensional image is a graphic representing lane markings and the image generation module causes the processor to augment the graphic of lane markings to simulate the corrective action activated by the lane keeping assist system.

16. A non-transitory computer-readable medium storing computer-executable instructions that when executed by a computer, which includes at least a processor, cause the computer to perform a method, the method comprising:

displaying on a vehicle display a two-dimensional image representing status a vehicle driver assistance system;

receiving an activation signal from the vehicle driver assistance system indicating activation of automatic vehicle control by the vehicle driver assistance system; and displaying a transition on the vehicle display of the two-dimensional image to a three-dimensional image including replacing the two-dimensional image with the three-dimensional image and augmenting the three-dimensional image to simulate motion of the automatic vehicle control in real-time.

17. The non-transitory computer-readable medium of claim 16, including receiving a deactivation signal from the vehicle driver assistance system and displaying a second transition from the three-dimensional image to the two-dimensional image.

\* \* \* \* \*